United States Patent
Fukamachi et al.

(10) Patent No.: US 11,613,028 B2
(45) Date of Patent: Mar. 28, 2023

(54) JOINT UNIT

(71) Applicant: Sony Interactive Entertainment Inc., Tokyo (JP)

(72) Inventors: Katsutsugu Fukamachi, Tokyo (JP); Keiji Togawa, Tokyo (JP); Hiroshi Osawa, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 17/527,449

(22) Filed: Nov. 16, 2021

(65) Prior Publication Data
US 2022/0305677 A1 Sep. 29, 2022

(30) Foreign Application Priority Data

Mar. 29, 2021 (JP) .............................. JP2021-056071

(51) Int. Cl.
*B25J 17/02* (2006.01)
*F16H 57/12* (2006.01)
(Continued)

(52) U.S. Cl.
CPC .......... *B25J 17/0241* (2013.01); *F16H 19/08* (2013.01); *F16H 55/20* (2013.01); *F16H 57/12* (2013.01); *F16H 2057/127* (2013.01)

(58) Field of Classification Search
CPC .......... F16H 19/08; F16H 57/12; F16H 19/12; F16H 55/18; F16H 55/20; F16H 2057/127; B25J 17/0241
See application file for complete search history.

(56) References Cited

U.S. PATENT DOCUMENTS

| 3,137,181 A | 6/1964 | Guilbert |
| 4,612,816 A * | 9/1986 | Chalik .................... F16H 55/18 |
| | | 74/401 |

(Continued)

FOREIGN PATENT DOCUMENTS

| JP | S47-10327 U | 10/1972 |
| JP | S61-197842 A | 9/1986 |

(Continued)

OTHER PUBLICATIONS

Japanese Office Action dated Sep. 6, 2022 for the Corresponding Japanese Patent Application No. 2021-056071.

*Primary Examiner* — William C Joyce
*Assistant Examiner* — Gregory Robert Weber
(74) *Attorney, Agent, or Firm* — Katten Muchin Rosenman LLP

(57) ABSTRACT

Disclosed herein is a joint unit including two facing gears that include respective two bevel gear members that face each other, and an intermediate gear that has a bevel gear member meshing with both the two bevel gear members. One of the two facing gears and the intermediate gear includes a first member including an inner circumferential portion of the bevel gear member of the one of the two facing gears and the intermediate gear; a second member including an outer circumferential portion of the bevel gear member of the one of the two facing gears and the intermediate gear; and a resilient member attached to one of the first member and the second member for normally urging the other of the first member and the second member to move in a direction along the directions of rotation of the one of the two facing gears and the intermediate gear.

9 Claims, 14 Drawing Sheets

(51) Int. Cl.
*F16H 19/08* (2006.01)
*F16H 55/20* (2006.01)

(56) References Cited

U.S. PATENT DOCUMENTS

| | | | |
|---|---|---|---|
| 6,170,349 B1 * | 1/2001 | Tanaka | F16H 55/20 |
| | | | 74/409 |
| 6,408,707 B1 * | 6/2002 | Kimura | F16H 55/20 |
| | | | 74/420 |
| 7,662,060 B2 * | 2/2010 | Miah | F16H 48/08 |
| | | | 475/235 |
| 9,958,057 B2 * | 5/2018 | Sahasrabudhe | F02B 75/282 |
| 10,414,044 B2 * | 9/2019 | Motomura | B25J 9/0009 |
| 2011/0265590 A1 * | 11/2011 | Long | F16H 55/20 |
| | | | 74/400 |
| 2019/0195337 A1 * | 6/2019 | Jeon | F01L 1/053 |

FOREIGN PATENT DOCUMENTS

| | | | | |
|---|---|---|---|---|
| WO | WO-2017217415 A1 * | 12/2017 | | B25J 17/00 |
| WO | 2017/217415 A1 | 4/2019 | | |

\* cited by examiner

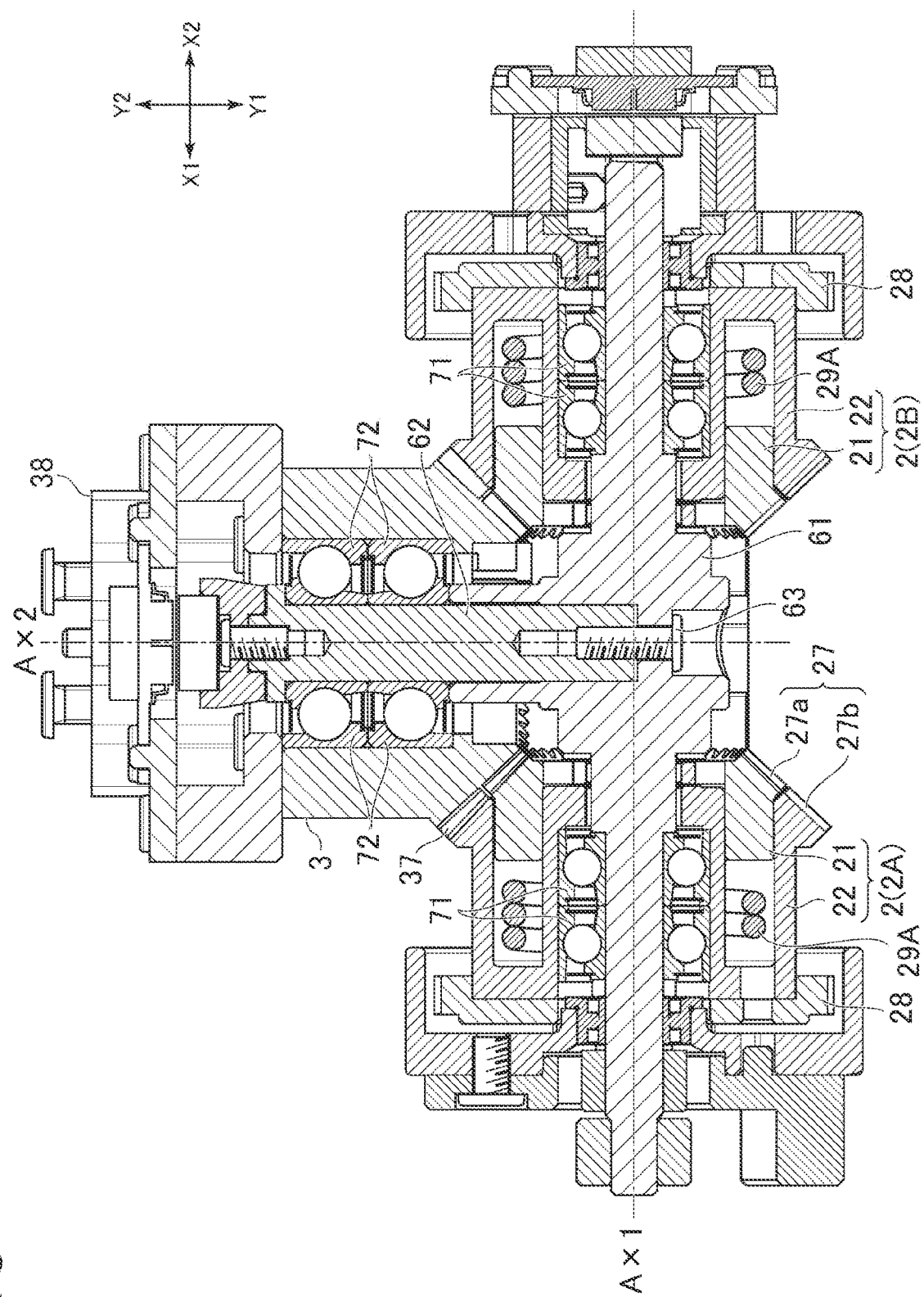

JOINT UNIT

CROSS REFERENCE TO RELATED APPLICATION

This application claims the benefit of Japanese Priority Patent Application JP 2021-056071 filed Mar. 29, 2021, the entire contents of which are incorporated herein by reference.

BACKGROUND

The present disclosure relates to a joint unit.

PCT Patent Publication No. WO2017/217415 discloses a joint unit capable of moving an arm of a robot or the like. The joint unit includes two bevel gears that face each other (hereinafter referred to as "facing gears") and a single bevel gear (hereinafter referred to as an "intermediate gear") positioned between the facing gears. The intermediate gear is connected to an arm and meshes with both the two facing gears. The two facing gears are rotatable independently of each other by the power from respective electric motors that are different from each other. When the two facing gears are rotated in one direction as viewed from a position between the two facing gears, e.g., when they are rotated clockwise, the intermediate gear is rotated about its own axis. When the two facing gears are rotated in the opposite directions as viewed from a position between the two facing gears, e.g., when one of the two facing gears is rotated clockwise and the other counterclockwise, the intermediate gear is rotated about the axes of the facing gears. These two types of motion of the intermediate gear make it possible to move the arm connected to the intermediate gear in two directions, e.g., in forward and rearward directions and leftward and rightward directions.

SUMMARY

If the clearance, i.e., backlash, between mating teeth of the facing gears and the intermediate gear is large, then the teeth of the facing gears and the teeth of the intermediate gear collide with each other when the facing gears start rotating. The collision between the mating teeth tends to cause gear noise and vibrations. Since backlash increases as the teeth are worn, at least one of the facing gears and the intermediate gear should preferably incorporate a mechanism for reducing backlash.

It is desirable to provide a joint unit that is capable of reducing backlash between facing gears and an intermediate gear.

According to an embodiment of the present disclosure, there is provided a joint unit including two facing gears that include respective two bevel gear members that face each other, and an intermediate gear that has a bevel gear member meshing with both the two bevel gear members, in which one of the two facing gears and the intermediate gear includes a first member including an inner circumferential portion of the bevel gear member of the one of the two facing gears and the intermediate gear, a second member including an outer circumferential portion of the bevel gear member of the one of the two facing gears and the intermediate gear, and a resilient member attached to one of the first member and the second member for normally urging the other of the first member and the second member to move in a direction along the directions of rotation of the one of the two facing gears and the intermediate gear. According to an embodiment of the present disclosure, it is possible to reduce backlash between the facing gears and the intermediate gear.

BRIEF DESCRIPTION OF THE DRAWINGS

FIG. 3 is a cross-sectional view taken along line III-III of FIG. 1B;

DETAILED DESCRIPTION OF THE PREFERRED EMBODIMENTS

First Embodiment

Figure 1A:
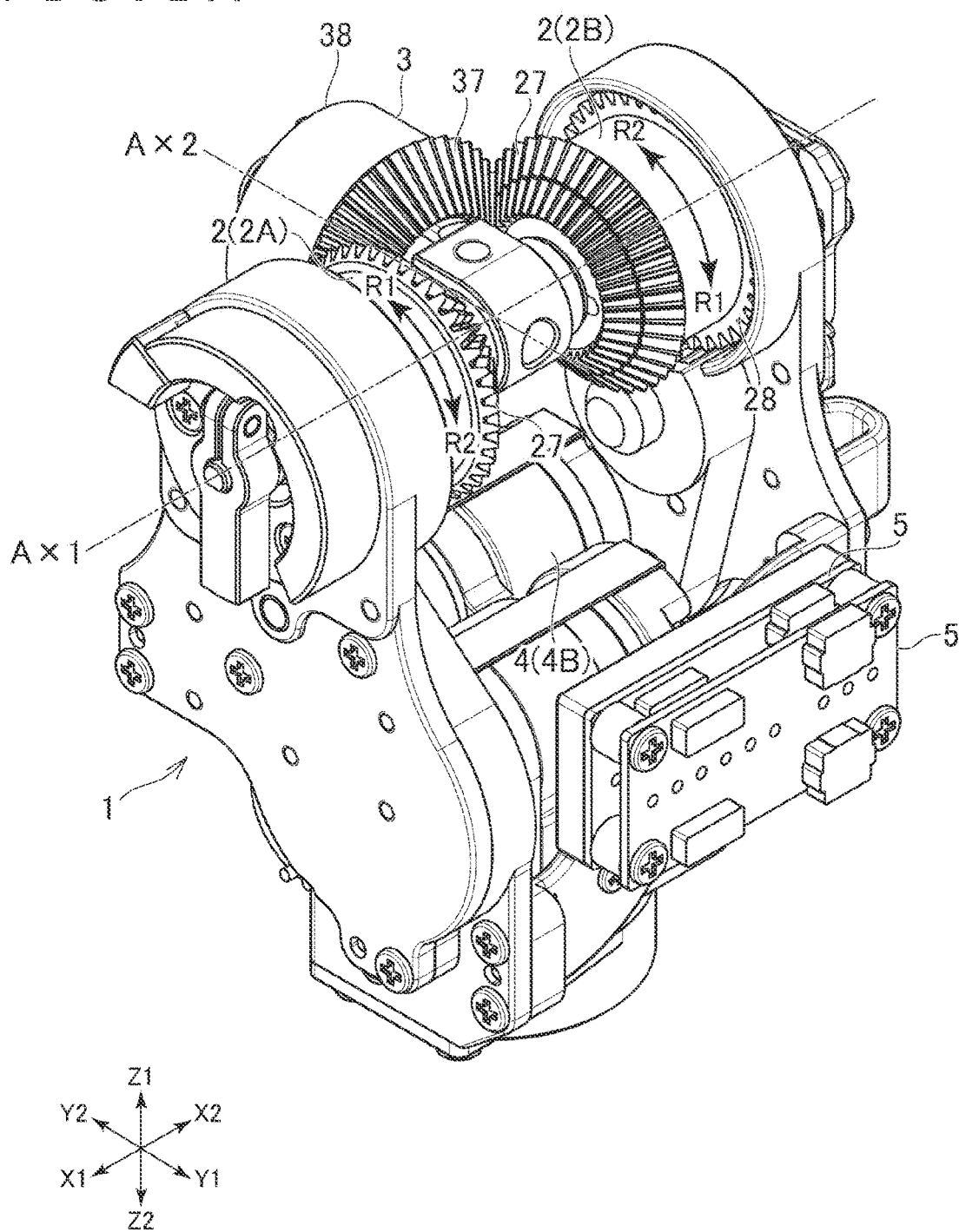
FIG. 1A is a perspective view of a joint unit according to an embodiment of the present disclosure.
Figure 1B:
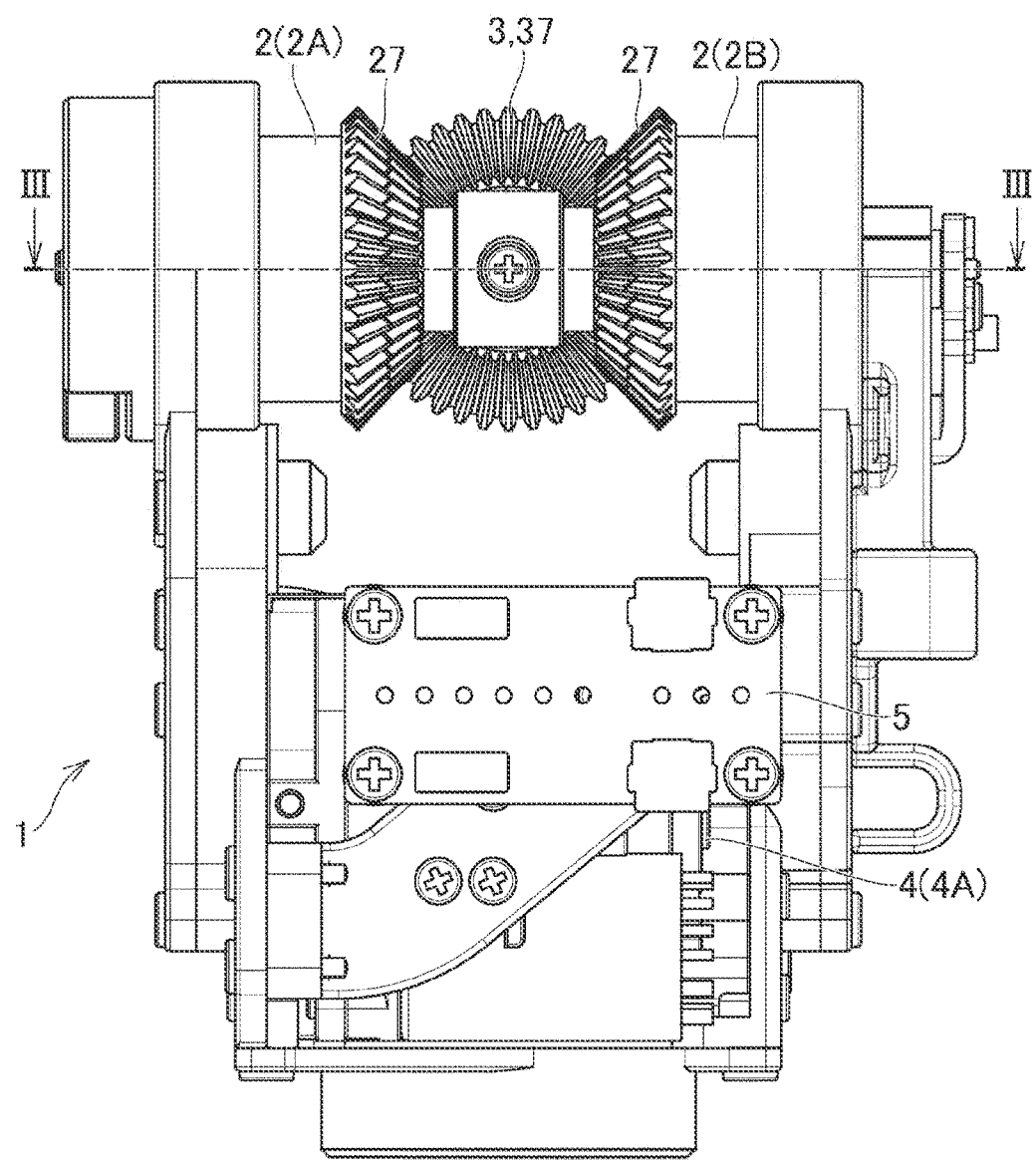
FIG. 1B is a front elevational view of the joint unit.
Figure 2A:
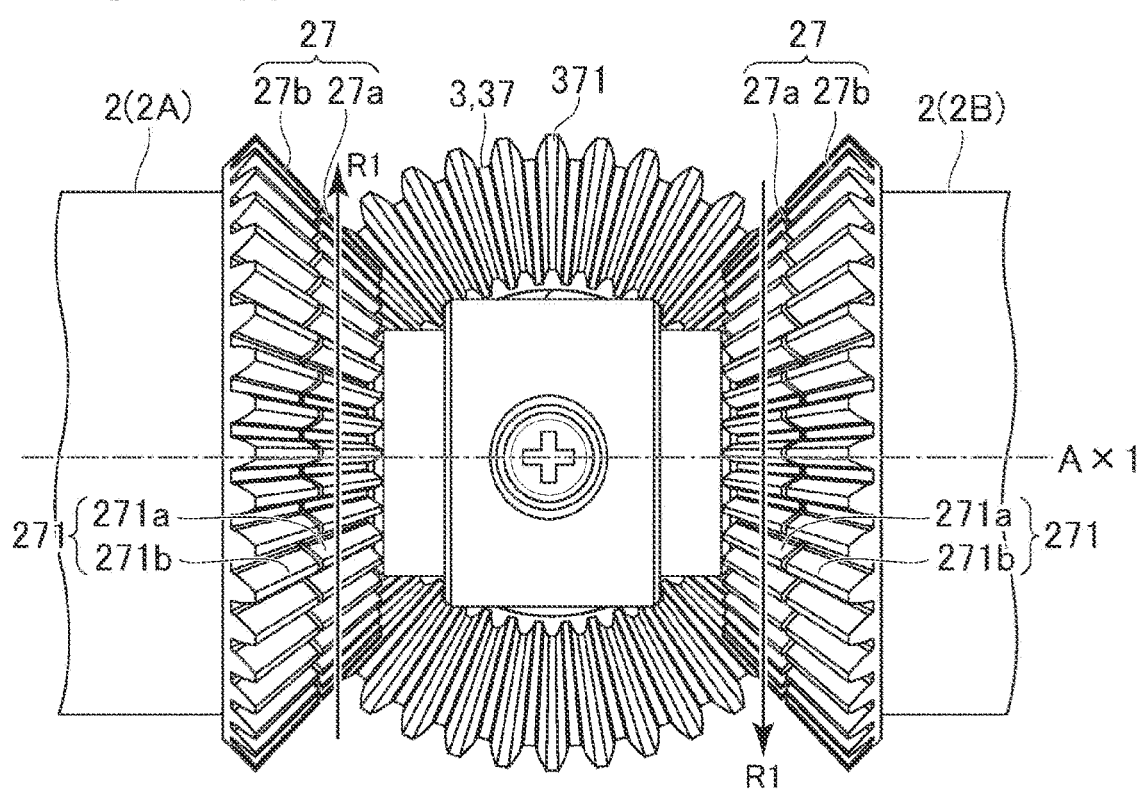
FIG. 2A is an enlarged fragmentary front elevational view of the joint unit.
Figure 2B:
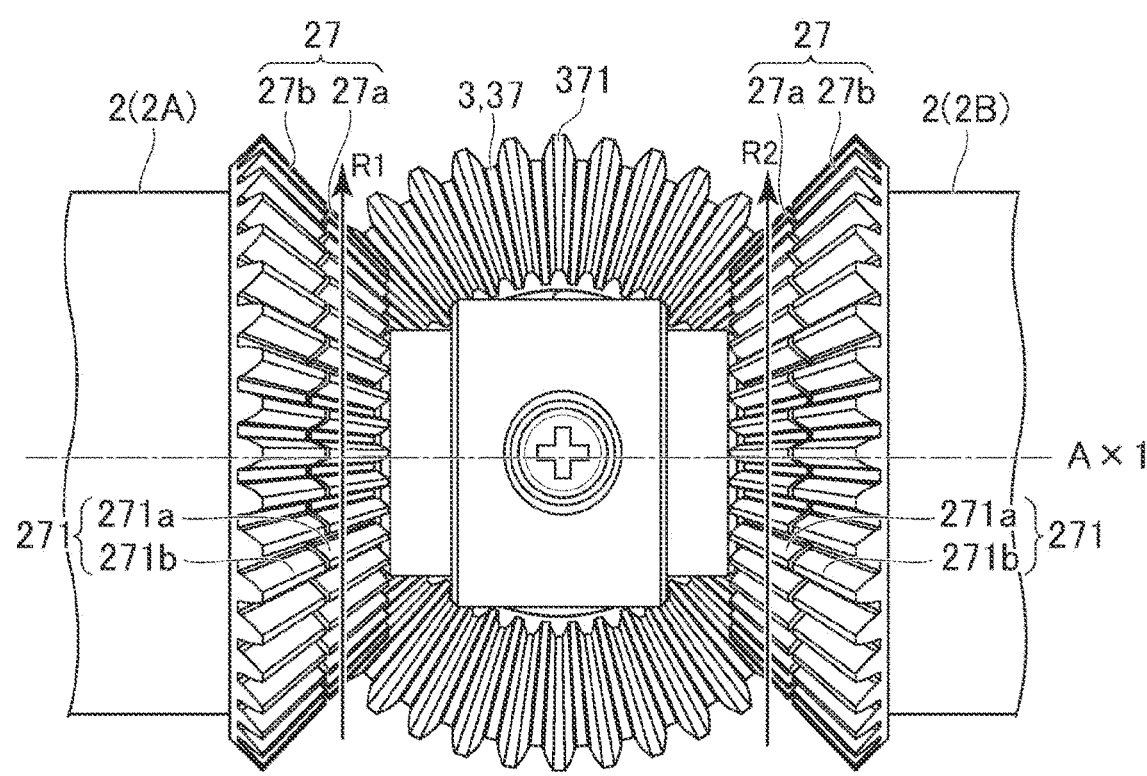
FIG. 2B is another enlarged fragmentary front elevational view of the joint unit.

First, an embodiment (first embodiment) of the present disclosure will be described below with reference to the drawings. FIG. 1A illustrates in perspective a joint unit 1 according to the first embodiment of the present disclosure. FIG. 1B illustrates the joint unit 1 in front elevation. FIGS. 2A and 2B illustrate in enlarged fragmentary front elevation the joint unit 1 illustrated in FIG. 1B, illustrating two facing gears 2 (2A and 2B) and an intermediate gear 3 of the joint unit 1. FIG. 3 illustrates in cross section the joint unit 1 taken along line III-III of FIG. 1B. In FIGS. 1A through 3, X1 and X2 represent a leftward direction and a rightward direction, respectively, Y1 and Y2 a forward direction and a rearward direction, respectively, and Z1 and Z2 an upward direction and a downward direction, respectively.

[Outline of the Joint Unit]

The joint unit 1 is incorporated in a robot or the like for moving an arm of the robot or the like. For example, the joint unit 1 is incorporated in a robot simulating a person or animal and functions as a joint for moving a neck, an arm, a leg, a hip, or the like of the robot.

As illustrated in FIGS. 1A and 1B, the joint unit 1 has the two facing gears 2 (2A and 2B) that face each other and the intermediate gear 3 that is relatively driven by each of the two facing gears 2. The two facing gears 2 include respective two bevel gear members 27 that face each other. The intermediate gear 3 includes a bevel gear member 37 meshing with both the bevel gear members 27 of each of the two facing gears 2. In the example illustrated in FIGS. 1A and 1B, the bevel gear members 27 of the two facing gears 2 face each other in the leftward and rightward directions across the intermediate gear 3. More specifically, the facing gear 2A is positioned on the left of the intermediate gear 3, and the facing gear 2B is positioned on the right of the intermediate gear 3. The present disclosure is not limited to such a gear layout, and the two facing gears 2 may face each other across the intermediate gear 3 along other directions (e.g., the upward and downward directions or directions oblique to the leftward and rightward directions or the upward and downward directions).

Further, as illustrated in FIGS. 2A and 2B, the respective bevel gear members 27 of the two facing gears 2 each have a plurality of teeth 271 arrayed along the directions of rotation of the facing gears 2, and the bevel gear member 37 of the intermediate gear 3 also has a plurality of teeth 371 arrayed along the directions of rotation of the intermediate gear 3. The width of each of the teeth 271 of the facing gears 2 is progressively larger toward the outer circumference of the facing gears 2. The width of each of the teeth 371 of the intermediate gear 3 is also progressively larger toward the outer circumference of the intermediate gear 3. The teeth 271 of the facing gears 2 include teeth 271a of inner circumferential gear portions 27a to be described later and teeth 271b of outer circumferential gear portions 27b to be described later.

The joint unit 1 allows the intermediate gear 3 to rotate relatively to the facing gears 2 about a first axis Ax1 illustrated in FIG. 1A and to rotate relatively to the facing gears 2 about a second axis Ax2 illustrated in FIG. 1A. A base 38 (see FIG. 3) is fixed to a side of the intermediate gear 3 that is opposite to the bevel gear member 37. For example, an arm, not illustrated, is fixed to the base 38. When the intermediate gear 3 rotates about the first axis Ax1 and the second axis Ax2, the arm is caused to move about the first axis Ax1 and to move about the second axis Ax2. Alternatively, the joint unit 1 may be mounted on an end of an arm. In this case, when the joint unit 1 (more specifically, the two facing gears 2) moves relatively to the base 38 of the intermediate gear 3, the arm is caused to move about the first axis Ax1 and to move about the second axis Ax2.

As illustrated in FIG. 1A, the joint unit 1 includes two electric motors 4 (4A and 4B). The electric motor 4A drives the facing gear 2A, and the electric motor 4B drives the facing gear 2B. More specifically, the joint unit 1 includes two drive gears 28 (see FIG. 3) fixed respectively to the two facing gears 2 and operatively coupled to the two electric motors 4, respectively. The two facing gears 2 are thus rotatable independently of each other about the first axis Ax1 by the power from the electric motors 4 that are different from each other. The two facing gears 2 can rotate in one direction or respective opposite directions as viewed from a position between the two facing gears 2. Further, the two facing gears 2 can rotate at respective different speeds while rotating in one direction. Further, while one of the two facing gears 2 is held at rest, only the other facing gear 2 can rotate.

Within the joint unit 1, the two electric motors 4 are arrayed in the forward and rearward directions and disposed in a superposed layout as viewed in the forward and rearward directions. This layout of the two electric motors 4 allows a space in the joint unit 1 to be effectively utilized. In addition, the electric motors 4 are controlled respectively by two control boards 5 that are also superposed one on another as viewed in the forward and rearward directions.

According to the present embodiment, the rotation in one direction of the two facing gears 2 as viewed from a position between the two facing gears 2 represents rotation of both the two facing gears 2 in the direction indicated by an arrow R1 in FIG. 1A or rotation of both the two facing gears 2 in the direction indicated by an arrow R2 in FIG. 1A. Further, according to the present embodiment, the rotation in opposite directions of the two facing gears 2 as viewed from a position between the two facing gears 2 represents rotation of one of the two facing gears 2 in the direction indicated by the arrow R1 in FIG. 1A and rotation of the other facing gear 2 in the direction indicated by the arrow R2 in FIG. 1A.

When the two facing gears 2 rotate in respective opposite directions, i.e., when one of the two facing gears 2 rotates in the direction indicated by the arrow R1 in FIG. 1A and the other facing gear 2 rotates in the direction indicated by the arrow R2 in FIG. 1A, the intermediate gear 3 relatively rotates about the second axis Ax2. Such relative motion of the intermediate gear 3 about the second axis Ax2 will hereinafter be referred to as "rolling motion." When the two facing gears 2 rotate in one direction, i.e., when both the two facing gears 2 rotate in the direction indicated by the arrow R1 or R2 in FIG. 1A, the intermediate gear 3 relatively rotates (moves) about the first axis Ax1. Such relative motion of the intermediate gear 3 about the first axis Ax1 will hereinafter be referred to as "pitching motion." The intermediate gear 3 can perform pitching motion, rolling motion, and composite motion representing a combination of pitching motion and rolling motion.

[Configuration of the Facing Gears]

Figure 4:
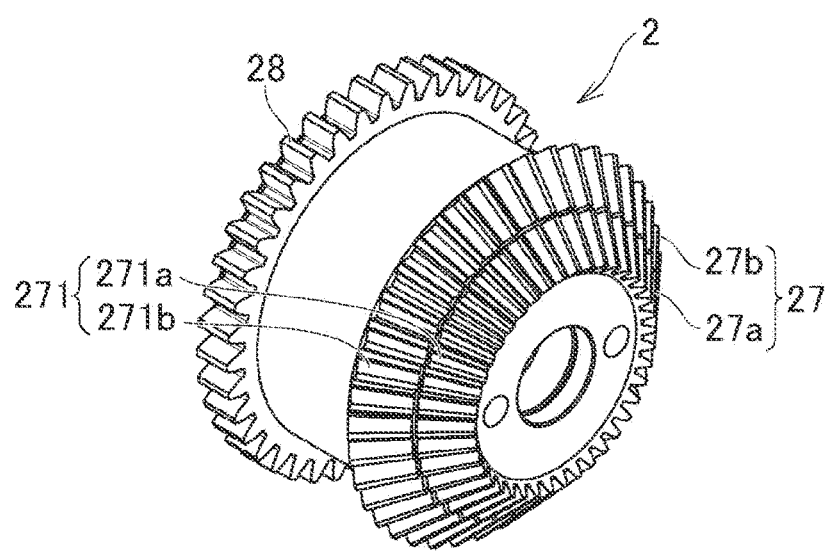
FIG. 4 is a perspective view of a facing gear.
Figure 5:
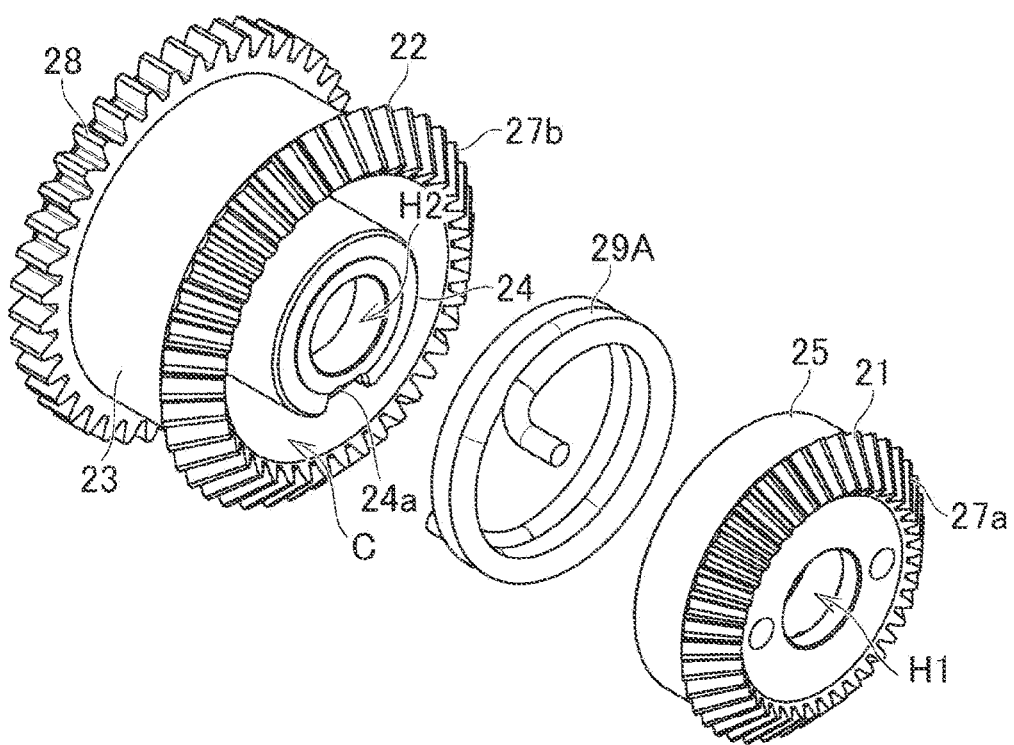
FIG. 5 is an exploded perspective view of the facing gear.

FIG. 4 illustrates a facing gear 2 in perspective, and FIG. 5 illustrates the facing gear 2 in exploded perspective. According to the present embodiment, the two facing gears 2 are identical in structure to each other, and their components can be manufactured more simply than if the two facing gears 2 are different in structure from each other. As illustrated in FIGS. 4 and 5, the facing gear 2, which represents each of the two facing gears 2 illustrated in FIGS. 1A through 3, includes a first member 21 and a second member 22. The first member 21 includes an inner circumferential portion 27a (hereinafter referred to as an "inner circumferential gear portion 27a") of the bevel gear member 27 of the facing gear 2, and the second member 22 includes an outer circumferential portion 27b (hereinafter referred to as an "outer circumferential gear portion 27b") of the bevel gear member 27 of the facing gear 2. The first member 21 and the second member 22 are combined with each other such that the inner circumferential gear portion 27a is disposed in and on a distal end side of the outer circumferential gear portion 27b, thereby making up the bevel gear member 27. Therefore, the bevel gear member 27 can be divided into the inner circumferential gear portion 27a and the outer circumferential gear portion 27b. The inner circumferential gear portion 27a has a plurality of teeth 271a arrayed in the directions of rotation of the facing gear 2, whereas the outer circumferential gear portion 27b has a plurality of teeth 271b arrayed in the directions of rotation of the facing gear 2. As illustrated in FIG. 4, the teeth 271a of the inner circumferential gear portion 27a and the teeth 271b of the outer circumferential gear portion 27b are radially aligned with each other, making up the teeth 271 of the bevel gear member 27.

As illustrated in FIG. 5, the second member 22 includes a first tubular portion 23. The first tubular portion 23 extends from the outer circumferential gear portion 27b of the facing gear 2 along the center line of rotation (the first axis Ax1) of the facing gear 2. The first member 21 is fitted in the first tubular portion 23. The first tubular portion 23 is of a hollow cylindrical shape, defining an annular space C in the first tubular portion 23. The first member 21 includes a third tubular portion 25 of a hollow cylindrical shape extending from the inner circumferential gear portion 27a of the facing gear 2 along the center line of rotation (the first axis Ax1) of the facing gear 2. The third tubular portion 25 is fitted in the annular space C defined in the first tubular portion 23.

As illustrated in FIG. 5, the second member 22 also has a second tubular portion 24 of a hollow cylindrical shape that is disposed in the first tubular portion 23 and smaller in diameter than the first tubular portion 23. The annular space C is defined by an inner circumferential surface of the first tubular portion 23 and an outer circumferential surface of the second tubular portion 24. The second tubular portion 24 has a circular axial hole H2 defined in a circle represented by the second tubular portion 24. The inner circumferential gear portion 27a of the first member 21 is of an annular shape with a circular axial hole H1 defined at a central position therein. As illustrated in FIG. 3, a first support shaft 61 (shaft member) that supports the facing gears 2 extends through the axial hole H1 in the first member 21 and the axial hole H2 in the second member 22.

As illustrated in FIG. 5, the second member 22 is fixed to a drive gear 28. More specifically, the drive gear 28 is fixed to the first tubular portion 23 opposite to the outer circumferential gear portion 27b of the bevel gear member 27 across the first tubular portion 23. The drive gear 28 may be integrally formed with the facing gear 2. The drive gear 28 is connected to the electric motor 4 and receives the power from the electric motor 4. Therefore, the power from the drive gear 28 directly acts on the outer circumferential gear portion 27b provided on the second member 22 fixed to the drive gear 28. Further, the first member 21 is fixed to the second member 22 through a resilient member 29A, so that the power from the drive gear 28 indirectly acts on the inner circumferential gear portion 27a provided on the first member 21.

As illustrated in FIG. 5, the facing gear 2 includes the resilient member 29A. The resilient member 29A is housed in the first tubular portion 23 of the second member 22 (more specifically, in the space C). As the resilient member 29A is housed in the facing gear 2, the joint unit 1 can be assembled with ease.

[Details of Layout Positions in the Joint Unit]

As illustrated in FIG. 3, the joint unit 1 includes the first support shaft 61 that is shaped as a rod extending along the first axis Ax1 and a second support shaft 62 that is shaped as a rod extending along the second axis Ax2. The second support shaft 62 is fixed to the first support shaft 61 by a screw 63, etc. The two facing gears 2 are supported on the first support shaft 61. The first support shaft 61 extends through the first member 21 and the second member 22 of each of the facing gears 2.

Ring-shaped bearing members 71 are mounted on the first support shaft 61. The bearing members 71 are disposed between the second members 22 (more specifically, the second tubular portions 24) of the facing gears 2 and the first support shaft 61. The bearing members 71 are held in contact with the facing gears 2 and the first support shaft 61, allowing the facing gears 2 to rotate in circumferential directions around the first support shaft 61 (i.e., in circumferential directions about the first axis Ax1). As described above, the second tubular portion 24 of the hollow cylindrical shape is provided in the first tubular portion 23 of the hollow cylindrical shape, and the resilient member 29A is housed in the annular space C defined by the inner circumferential surface of the first tubular portion 23 and the outer circumferential surface of the second tubular portion 24. According to the present embodiment, the resilient member 29A is of a ring shape, as illustrated in FIG. 5, and the bearing members 71 are disposed within the ring-shaped resilient members 29A between the second tubular portions 24 of the second members 22 and the first support shaft 61, as illustrated in FIG. 3. This layout allows the space in the joint unit 1 to be effectively utilized. Further, ring-shaped bearing members 72 are also mounted on the second support shaft 62. The bearing members 72 are held in contact with the intermediate gear 3 and the second support shaft 62, allowing the intermediate gear 3 to rotate in circumferential directions around the second support shaft 62 (i.e., in circumferential directions about the second axis Ax2). The bearing members 71 and 72 may include angular bearings.

According to the present embodiment, the resilient member 29A is attached to the second member 22 (more specifically, the inside of the first tubular portion 23), and normally urges the first member 21 to move in a direction along the directions of rotation of the facing gear 2. The resilient member 29A being attached to the second member 22 may mean that the resilient member 29A has an end fixed to the second member 22 or is simply abutting against the second member 22. The facing gear 2 is rotatable in circumferential directions about the first axis Ax1, and the resilient member 29A normally urges the first member 21 to move in a direction along the directions of rotation of the facing gear 2. The direction along the directions of rotation of the facing gear 2 refers to a circumferential direction about the first axis Ax1, and may refer to one of the directions of rotation of the facing gears 2 (the directions indicated by the arrows R1 and R2 in FIG. 1A) itself or a direction opposite thereto. In the example illustrated in FIG. 5, the resilient member 29A includes a torsion spring having an end fixed to the first member 21 and another end fixed to the second member 22. However, the resilient member 29A is not limited to a torsion spring, but may be a spring of another kind.

When the first member 21 is normally urged to move in a direction along the directions of rotation of the facing gear 2 under the resilient force from the resilient member 29A, there is established a mechanism (scissors mechanism) for sandwiching the teeth 371 of the bevel gear member 37 of the intermediate gear 3 between the teeth 271a of the inner circumferential gear portion 27a of the first member 21 and the teeth 271b of the outer circumferential gear portion 27b of the second member 22. With this arrangement, backlash or clearance between the teeth 271 of the facing gear 2 and the teeth 371 of the intermediate gear 3 is reduced, restraining noise and vibrations caused by backlash between the facing gears 2 and the intermediate gear 3.

According to the present embodiment, the first member 21, the second member 22, and the resilient member 29A are included in each of the two facing gears 2. As illustrated in FIG. 2A, the two first members 21 included in the respective two facing gears 2 may be normally urged by the resilient members 29A to move in one direction as viewed from a position between the two facing gears 2. In the example illustrated in FIG. 2A, both the two first members 21 are normally urged to move in the direction indicated by the arrow R1 in FIGS. 1A and 2A. The present disclosure is not limited to such a direction, but both the two first members 21 may be normally urged to move in the direction indicated by the arrow R2 in FIG. 1A.

When the two first members 21 included in the respective two facing gears 2 are normally urged by the resilient members 29A to move in one direction as viewed from a position between the two facing gears 2, the intermediate gear 3 can be positionally controlled in good balance at the positions where the two facing gears 2 are disposed. The positional control is thus suitable for rotating the intermediate gear 3 about the second axis Ax2 (i.e., for causing the intermediate gear 3 to make rolling motion) by rotating the two facing gears 2 in one direction about the first axis Ax1.

Alternatively, as illustrated in FIG. 2B, the two first members 21 included in the respective two facing gears 2 may be normally urged by the resilient members 29A to move in respective opposite directions as viewed from a position between the two facing gears 2. In the example illustrated in FIG. 2B, the first member 21 of one of the two facing gears 2A is normally urged to move in the direction indicated by the arrow R1 in FIGS. 1A and 2A, and the first member 21 of the other facing gear 2B is normally urged to move in the direction indicated by the arrow R2 in FIGS. 1A and 2A. The present disclosure is not limited to such directions, but the first member 21 of one of the two facing gears 2A may be normally urged to move in the direction indicated by the arrow R2 in FIG. 1A, and the first member 21 of the other facing gear 2B may be normally urged to move in the direction indicated by the arrow R1 in FIG. 1A.

When the two first members 21 included in the respective two facing gears 2 are normally urged to move in respective opposite directions as viewed from a position between the two facing gears 2, the intermediate gear 3 can be positionally controlled while the teeth 271a of the inner circumferential gear portions 27a of the first members 21 are being pressed in one direction. The positional control is thus suitable for rotating the intermediate gear 3 about the first axis Ax1 (i.e., for causing the intermediate gear 3 to make pitching motion) by rotating the two facing gears 2 in respective opposite directions about the first axis Ax1.

[Limiter]

The second member 22 of each of the facing gears 2 includes a limiter for limiting movement of the first member 21 in directions along the directions of rotation of the facing gear 2. As illustrated in FIG. 5, the second tubular portion 24 is disposed in the second member 22 and has a recessed part 24a defined in a crest thereof. The limiter for limiting movement of the first member 21 includes the recessed part 24a. The recessed part 24a is defined in the second tubular portion 24 at a position slightly shifted from the circular axial hole H2 defined therein. The recessed part 24a is defined in an end of the second tubular portion 24.

Figure 6:
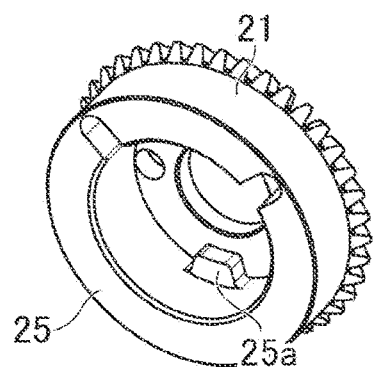
FIG. 6 is a perspective view of a first member of the facing gear.

FIG. 6 illustrates in perspective the first member 21 of the facing gear 2. As illustrated in FIG. 6, the first member 21 has a projected part 25a in the hollow cylindrical third tubular portion 25. When the first member 21 and the second member 22 are combined with each other, the projected part 25a of the first member 21 is fitted in the recessed part 24a in the second member 22. The projected part 25a fitted in the recessed part 24a thus limits movement of the first member 21 in directions along the directions of rotation of the facing gear 2.

Figure 7:
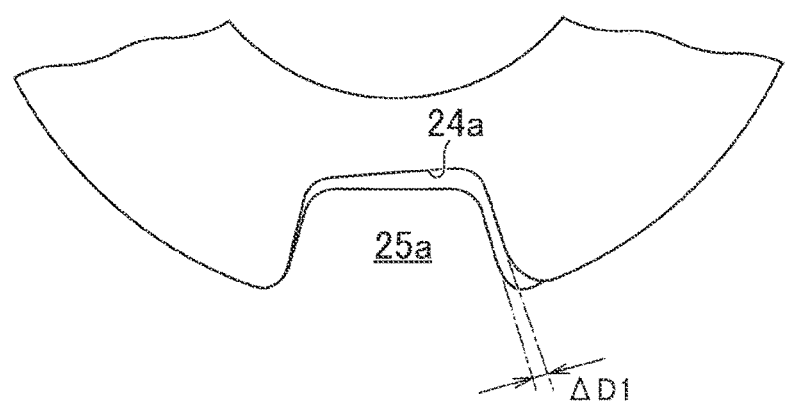
FIG. 7 is an enlarged fragmentary view of a limiter of the facing gear.

FIG. 7 illustrates the limiter of the facing gear 2 fragmentarily at an enlarged scale. FIG. 7 illustrates the manner in which the projected part 25a of the first member 21 is fitted in the recessed part 24a in the second member 22. As illustrated in FIG. 7, when the first member 21 and the second member 22 are combined with each other, the projected part 25a of the first member 21 is fitted in the recessed part 24a in the second member 22. On one side (the left side in FIG. 7) in the directions along the directions of rotation of the facing gear 2, the projected part 25a has an edge abutting against an edge of the recessed part 24a under the urging force of the resilient member 29A. On the other side (the right side in FIG. 7) in the directions along the directions of rotation of the facing gear 2, a gap ΔD1 is formed between the edge of the projected part 25a and the edge of the recessed part 24a.

The first member 21 can move within a range allowed by the limiter (the recessed part 24a) of the second member 22. In the example illustrated in FIG. 7, the first member 21 can move in the range of the gap ΔD1 between the edge of the projected part 25a and the edge of the recessed part 24a. If the first member 21 rotates beyond the allowed range (the gap ΔD1 in FIG. 7), then it is difficult to obtain the resilient force of the resilient member 29A on the first member 21. The limiter (the recessed part 24a) is effective to prevent the first member 21 from rotating beyond the allowed range, securing the resilient force of the resilient member 29A on the first member 21. Further, the limiter (the recessed part 24a) is effective to position the first member 21 and the second member 22 in the directions of rotation of the facing gear 2, securing a pre-designed force as the resilient force obtained from the resilient member 29A. In other words, a force for keeping the facing gear teeth in mesh with the teeth of the intermediate gear 3 can be secured in design.

Figure 8:
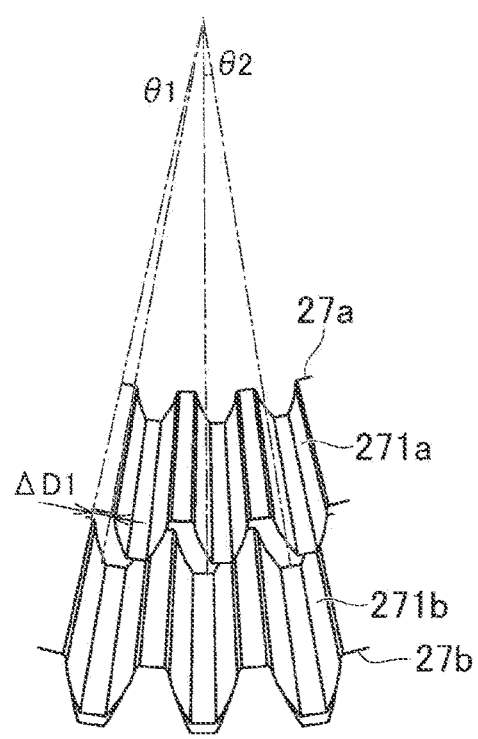
FIG. 8 is an enlarged fragmentary perspective view of bevel gear teeth of the facing gear.

FIG. 8 illustrates at an enlarged scale a portion of the inner circumferential gear portion 27a of the facing gear 2 and a portion of the outer circumferential gear portion 27b of the facing gear 2, illustrating the manner in which the facing gear 2 is not in mesh with the intermediate gear 3. As illustrated in FIG. 8, the angle θ1 of the range (the gap ΔD1) in which motion of the first member 21 is allowed by the limiter (the recessed part 24a) of the facing gear 2 is set to a value equal to or smaller than ½ of the angle θ2 between two adjacent teeth 271 of the bevel gear member 27 of the facing gear 2. In FIG. 8, though the angle between two adjacent teeth 271b of the outer circumferential gear portion 27b is illustrated as θ2, the angle between two adjacent teeth 271a of the inner circumferential gear portion 27a is also identical to the above angle. This angle setting allows the teeth 371 of the intermediate gear 3 to be inserted between the teeth 271a of the inner circumferential gear portion 27a of the facing gear 2 and the teeth 271b of the outer circumferential gear portion 27b of the facing gear 2, making it easy to combine the facing gear 2 and the intermediate gear 3 with each other. The angle θ1 of the range (the gap ΔD1) in which motion of the first member 21 is allowed by the limiter (the recessed part 24a) may be set to a value equal to or smaller than ⅓ of the angle θ2 between two adjacent teeth 271 of the bevel gear member 27 of the facing gear 2.

As described above, each of the facing gears 2 of the joint unit 1 according to the present embodiment includes the first member 21 including the inner circumferential gear portion 27a, the second member 22 including the outer circumferential gear portion 27b, and the resilient member 29A. The resilient member 29A normally urges the first member 21 to move in a direction along the directions of rotation of the facing gear 2, thereby sandwiching the teeth 371 of the bevel gear member 37 of the intermediate gear 3 between the teeth 271a of the inner circumferential gear portion 27a of the first member 21 and the teeth 271b of the outer circumferential gear portion 27b of the second member 22. With this arrangement, backlash between the facing gear 2 and the intermediate gear 3 is reduced.

Second Embodiment

Next, another embodiment (second embodiment) of the present disclosure will be described below with reference to the drawings. A joint unit 1 according to the present embodiment has two facing gears 2 that face each other and an intermediate gear 3 that meshes with the two facing gears 2, as with the first embodiment. The differences between the first embodiment and the second embodiment will be described hereinbelow with reference to the drawings.

Figure 9:
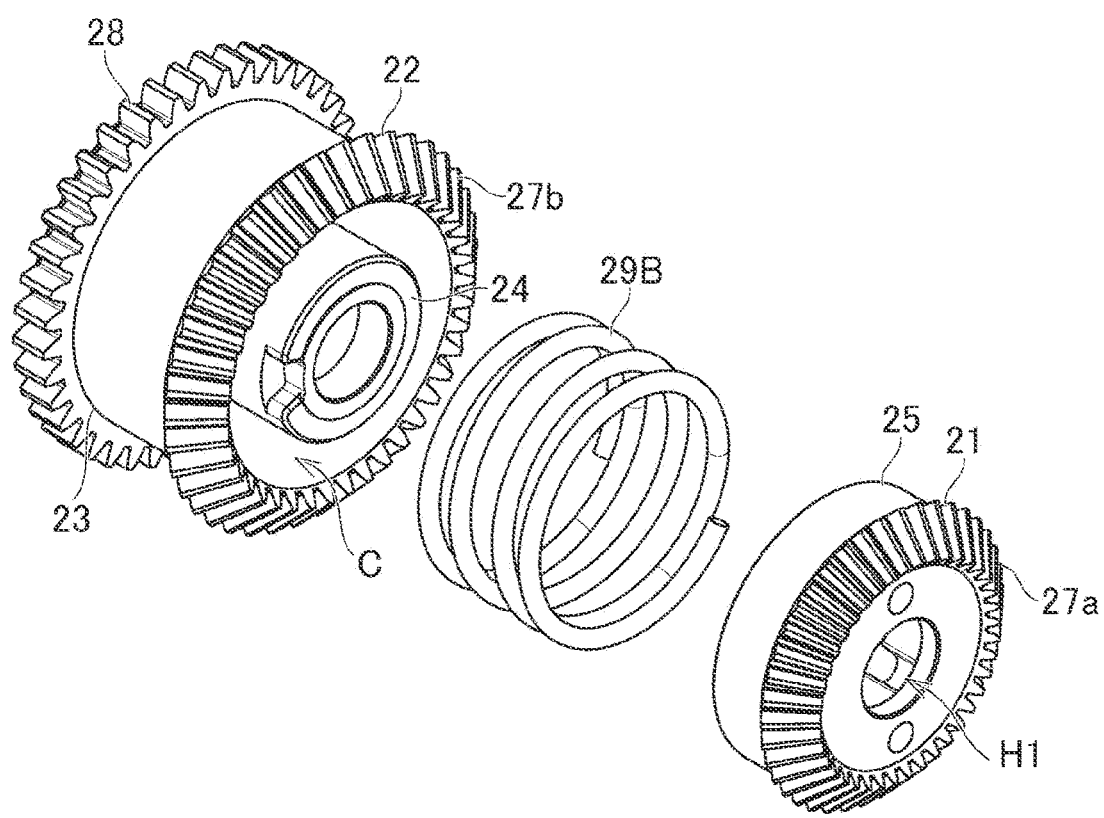
FIG. 9 is an exploded perspective view of a facing gear according to another embodiment of the present disclosure.

FIG. 9 illustrates in exploded perspective a facing gear 2 according to the present embodiment. As illustrated in FIG. 9, the facing gear 2 according to the present embodiment has a resilient member 29B that is different in shape from the resilient member 29A described according to the first embodiment. In the example illustrated in FIG. 9, the resilient member 29B includes a helical spring. However, the resilient member 29B is not limited to a helical spring, but may be a spring of another kind.

Figure 10:
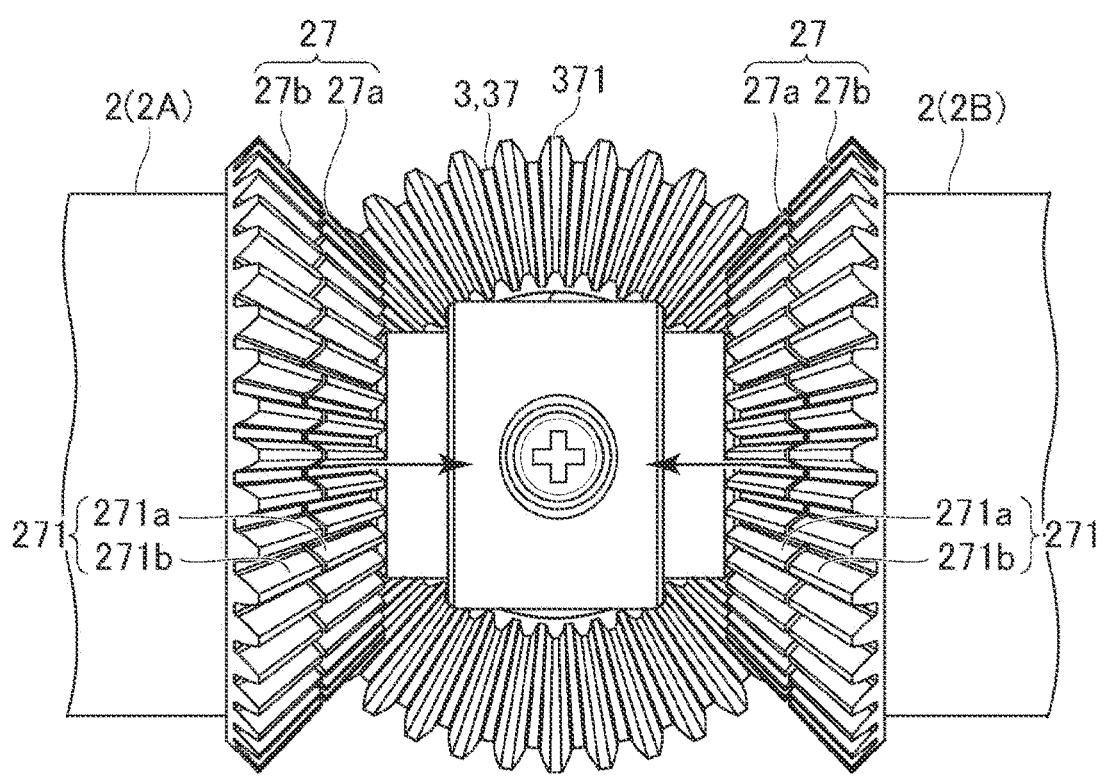
FIG. 10 is an enlarged fragmentary front elevational view of a joint unit according to the other embodiment of the present disclosure.

FIG. 10 illustrates in enlarged fragmentary front elevation the joint unit 1 according to the present embodiment, illustrating two facing gears 2 (2A and 2B) and an intermediate gear 3 of the joint unit 1. As illustrated in FIG. 10, the resilient member 29B according to the present embodiment normally urges at least a portion of the bevel gear member 27 of the facing gear 2 to move toward the intermediate gear 3 in a direction along the center line of rotation (the first axis Ax1) of the facing gear 2.

The width of each of the teeth 271 of the bevel gear member 27 of the facing gear 2 is progressively larger toward the outer circumference of the bevel gear member 27. As the resilient member 29B normally urges at least a portion of the bevel gear member 27 in a direction along the center line of rotation (the first axis Ax1) of the facing gear 2, the teeth 271 of the bevel gear member 27 are pressed in order to fill the gap between two adjacent teeth 371 of the bevel gear member 37 of the intermediate gear 3. Therefore, when the resilient member 29B normally urges at least a portion of the bevel gear member 27 in a direction along the center line of rotation (the first axis Ax1) of the facing gear 2, backlash or clearance between the teeth 271 of the facing gear 2 and the teeth 371 of the intermediate gear 3 is reduced, restraining noise and vibrations caused by backlash between the facing gear 2 and the intermediate gear 3.

According to the present embodiment, both the two facing gears 2 of the joint unit 1 include respective resilient members 29B. The resilient members 29B of the respective two facing gears 2 normally urge at least a portion of the bevel gear members 27, pressing the intermediate gear 3 on both sides thereof to thereby reduce backlash between the facing gears 2 and the intermediate gear 3 and to also properly adjust (center) the position of the intermediate gear 3 on the center line of rotation (the first axis Ax1) of the facing gears 2.

As illustrated in FIG. 9, each of the facing gears 2 according to the present embodiment includes a first member 21 and a second member 22 similar to those according to the first embodiment. Therefore, the resilient member 29B normally urges the first member 21 to move toward the intermediate gear 3 in a direction along the center line of rotation (the first axis Ax1) of the facing gear 2. According to the present embodiment, the first members 21 are normally urged by the resilient members 29B in both the two facing gears 2 of the joint unit 1.

Further, the resilient member 29B is disposed in the facing gear 2, as with the resilient member 29A described according to the first embodiment. More specifically, as illustrated in FIG. 9, the second member 22 includes the first tubular portion 23 extending from the outer circumferential gear portion 27b of the first member 21 in a direction along the center line of rotation (the first axis Ax1) of the facing gear 2, and the resilient member 29B is disposed in the first tubular portion 23 of the second member 22. This arrangement makes it easy to assemble the joint unit 1. The hollow cylindrical second tubular portion 24 is disposed in the hollow cylindrical first tubular portion 23, and the resilient member 29B is housed in the annular space C that is defined by the inner circumferential surface of the first tubular portion 23 and the outer circumferential surface of the second tubular portion 24.

The joint unit 1 according to the present embodiment has a configuration similar to that of the joint unit 1 illustrated in FIG. 3, and the resilient member 29B is disposed in the same position as the position in which the resilient member 29A illustrated in FIG. 3 is disposed. According to the present embodiment, the joint unit 1 includes the first support shaft 61 (shaft member) that extends through the first member 21 and the second member 22 of the facing gear 2 and the bearing members 71 disposed between the second member 22 (more specifically, the second tubular portion 24) and the first support shaft 61. As illustrated in FIG. 9, according to the present embodiment, the resilient member 29B is of a helical configuration, and the bearing members 71 are disposed in the resilient member 29B between the second tubular portion 24 of the second member 22 and the first support shaft 61. This layout allows a space in the joint unit 1 to be effectively utilized.

As illustrated above, with the joint unit 1 according to the present embodiment, the resilient member 29B normally urges at least a portion of the bevel gear members 27 of the facing gears 2 to move toward the intermediate gear 3 in directions along the center line of rotation (the first axis Ax1) of the facing gears 2. With this arrangement, backlash or clearance between the teeth 271 of the facing gears 2 and the teeth 371 of the intermediate gear 3 is reduced.

[Modifications]

The present disclosure is not limited to the joint unit 1 described above, but may cover various changes and modifications. According to the first embodiment, for example, each of the two facing gears 2 can be divided into the first member 21 including the inner circumferential gear portion 27a and the second member 22 including the outer circumferential gear portions 27b, and the first member 21 of the facing gear 2 is normally urged by the resilient member 29A. However, the present disclosure is not limited to such details. The intermediate gear 3 may be dividable into an inner circumferential portion of the bevel gear member 37 and an outer circumferential portion of the bevel gear member 37, and the inner circumferential portion of the bevel gear member 37 may be normally urged by a resilient member disposed in the intermediate gear 3 in a direction (a circumferential direction around the second axis Ax2) along the direction of rotation of the intermediate gear 3. With this arrangement, the teeth of the inner circumferential portion of the bevel gear member 37 of the intermediate gear 3 and the teeth of the outer circumferential portion thereof sandwich the teeth 271 of the bevel gear members 27 of the facing gears 2, reducing backlash between the facing gears 2 and the intermediate gear 3.

Further, according to the first embodiment, the resilient member 29A is attached to the second member 22 including the outer circumferential gear portion 27b of each of the facing gears 2, and normally urges the first member 21 including the inner circumferential gear portion 27a in a direction along the directions of rotation of the facing gear 2. However, the present disclosure is not limited to such details. The resilient member 29A may be attached to the first member 21 including the inner circumferential gear portion 27a and may normally urge the second member 22 including the outer circumferential gear portion 27b in a direction (a circumferential direction around the second axis Ax2) along the directions of rotation of the facing gear 2. With this arrangement, the teeth 271a of the inner circumferential gear portion 27a and the teeth 271b of the outer circumferential gear portion 27b sandwich the teeth 371 of the bevel gear member 37 of the intermediate gear 3, reducing backlash between the facing gears 2 and the intermediate gear 3.

Further, according to the second embodiment, the resilient member 29B normally urges at least a portion of the bevel gear member 27 to move toward the intermediate gear 3 in a direction along the center line of rotation (the first axis Ax1) of the facing gear 2. However, the present disclosure is not limited to such details. A resilient member disposed in the intermediate gear 3 may normally urge at least a portion of the bevel gear member 37 of the intermediate gear 3 in a direction (the second axis Ax2) along the center line of rotation of the intermediate gear 3. In this case, the intermediate gear 3 may be dividable into an inner circumferential portion of the bevel gear member 37 and an outer circumferential portion of the bevel gear member 37, and one of the inner circumferential portion and the outer circumferential portion may be normally urged by the resilient member in the intermediate gear 3. With this arrangement, the teeth 371 of the intermediate gear 3 are pressed in order to fill the gap between adjacent teeth 271 of the facing gear 2, reducing backlash or clearance between the teeth 271 of the facing gear 2 and the teeth 371 of the intermediate gear 3.

In addition, according to the first embodiment, the resilient member 29A includes a torsion spring, as described above. However, the present disclosure is not limited to such details. The resilient member 29A may include any of various springs.

Figure 11:
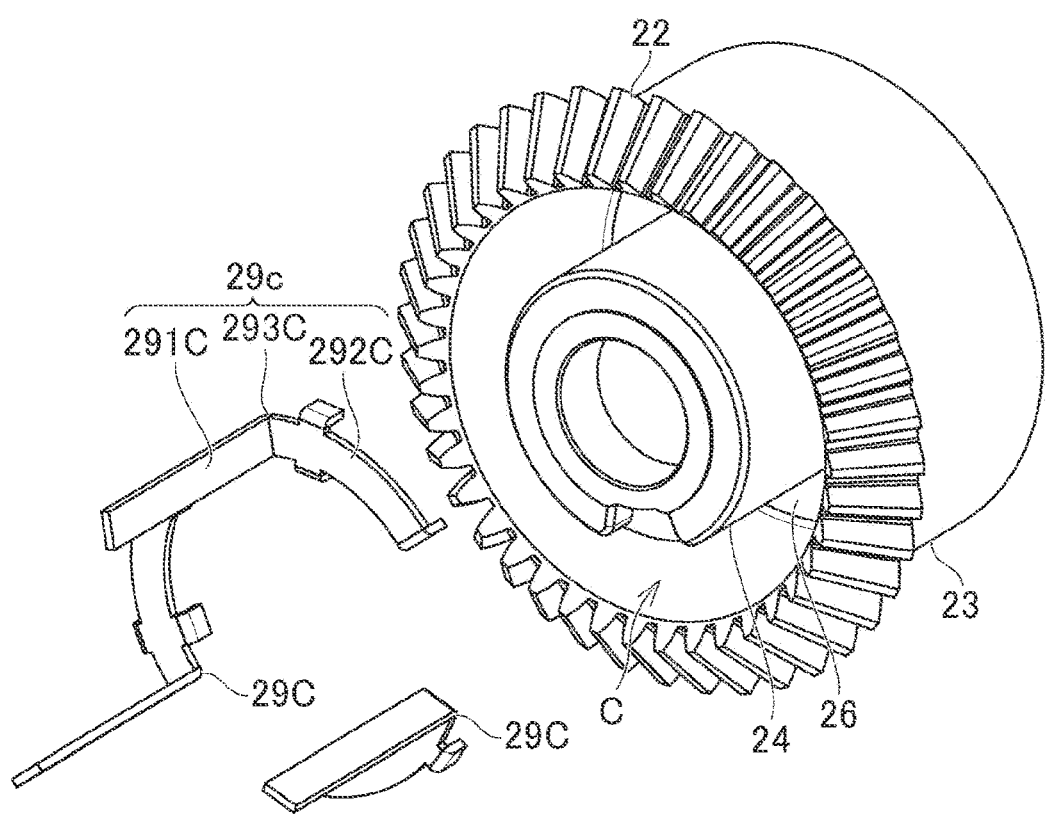
FIG. 11 is a perspective view of resilient members and a second member according to a modification of the present disclosure.

FIG. 11 illustrates in perspective resilient members 29C according to a modification of the present disclosure, and the second member 22. As illustrated in FIG. 11, the resilient members 29C include leaf springs. Each of the resilient members 29C includes a leaf spring portion 291C and a fixed portion 292C fixed to the second member 22. The fixed portion 292C is of a plate shape complementary to the shape of the annular space C. The fixed portion 292C has a width from an outer circumference of the space C (the inner circumferential surface of the first tubular portion 23) to an inner circumference of the space C (the outer circumferential surface of the second tubular portion 24), and extends arcuately in the annular space C. The fixed portion 292C is fixed to a wall surface 26 defined between the inner circumferential surface of the first tubular portion 23 and the outer circumferential surface of the second tubular portion 24. The leaf spring portion 291C is of a plate shape integrally formed with the fixed portion 292C, has the same width as the fixed portion 292C, and extends perpendicularly to the fixed portion 292C. The resilient member 29C has its leaf spring portion 291C resiliently flexible with respect to the fixed portion 292C to normally urge the first member 21 in a circumferential direction around the first axis Ax1, as is the case with the first embodiment. In FIG. 11, one facing gear 2 includes three resilient members 29C. However, one facing gear 2 may include one resilient member 29C or a plurality of resilient members 29C other than three resilient members 29C.

Figure 12:
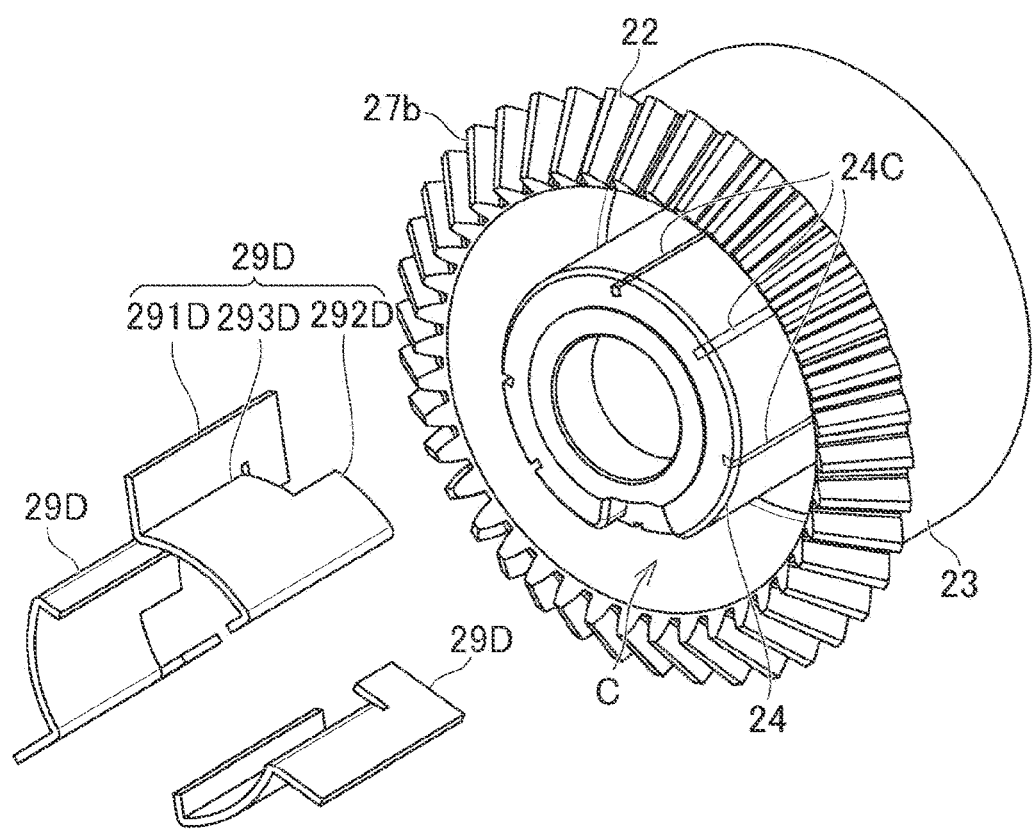
FIG. 12 is a perspective view of resilient members and a second member according to another modification of the present disclosure.

FIG. 12 illustrates in perspective resilient members 29D according to another modification of the present disclosure, and the second member 22. As illustrated in FIG. 12, the resilient members 29D include leaf springs as with the resilient members 29C. Each of the resilient members 29D includes a leaf spring portion 291D and a fixed portion 292D fixed to the second member 22. The fixed portion 292D is fixedly placed in a groove 24c defined in the outer circumferential surface of the second tubular portion 24. The resilient member 29D also has its leaf spring portion 291D resiliently flexible with respect to the fixed portion 292D to normally urge the first portion 21 in a circumferential direction around the first axis Ax1. In FIG. 12, one facing gear 2 includes three resilient members 29D. However, one facing gear 2 may include one resilient member 29D or a plurality of resilient members 29D other than three resilient members 29D.

With the resilient member 29C illustrated in FIG. 11, a junction 293C between the leaf spring portion 291C and the fixed portion 292C extends perpendicularly to the first axis Ax1. With the resilient member 29D illustrated in FIG. 12, however, a junction 293D between the leaf spring portion 291D and the fixed portion 292D extends parallel to the first axis Ax1, and is longer than the junction 293C. The junction 293D makes the leaf spring portion 291D stronger in stiffness than the leaf spring portion 291C, and is able to normally urge the first member 21 with a stronger force.

Figure 13:
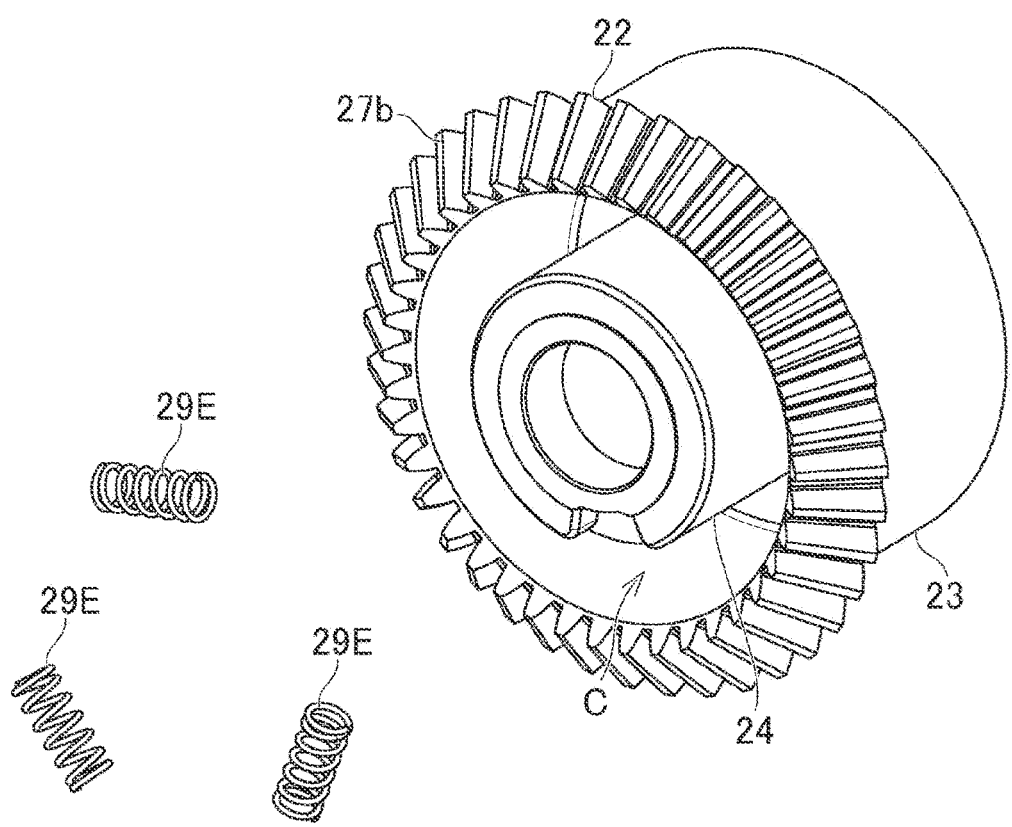
FIG. 13 is a perspective view of resilient members and a second member according to still another modification of the present disclosure.

FIG. 13 illustrates in perspective resilient members 29E according to still another modification of the present disclosure, and the second member 22. As illustrated in FIG. 13, the resilient members 29E include helical springs. Each of the resilient members 29E has an outside diameter equal to or smaller than a width from an inner circumference of the space C (the outer circumferential surface of the second tubular portion 24) in the second member 22 to an outer circumference of the space C (the inner circumferential surface of the first tubular portion 23), and is disposed to lie in the space C. The resilient members 29E thus constructed are able to normally urge the first member 21 in a circumferential direction around the first axis Ax1. In FIG. 13, one facing gear 2 includes three resilient members 29E. However, one facing gear 2 may include one resilient member 29E or a plurality of resilient members 29E other than three resilient members 29E.

The resilient members 29E illustrated in FIG. 13 may be erected in the space C. The resilient members 29E thus erected are able to normally urge the first member 21 to move toward the intermediate gear 3 in a direction along the center line of rotation (the first axis Ax1) of the facing gear 2, reducing backlash or clearance between the facing gear 2 and the intermediate gear 3.

It should be understood by those skilled in the art that various modifications, combinations, sub-combinations and alterations may occur depending on design requirements and other factors insofar as they are within the scope of the appended claims or the equivalents thereof.

What is claimed is:
1. A joint unit comprising:
a first bevel gear having a first bevel gear member;
a second bevel gear having a second bevel gear member, wherein the first bevel gear member faces the second bevel gear member; and a third bevel gear that has a third bevel gear member meshing with both the first bevel gear member and the second bevel gear member,
wherein one of the first bevel gear, the second bevel gear, and the third bevel gear includes
a first member including an inner circumferential portion of the first bevel gear member, the second bevel gear member, or the third bevel gear member,
a second member including an outer circumferential portion of the first bevel gear member, the second bevel gear member, or the third bevel gear member, and
a resilient member attached to one of the first member and the second member for normally urging the other of the first member and the second member to move in a direction along directions of rotation of the first bevel gear, the second bevel gear, or the third bevel gear,
wherein the second member includes a limiter for limiting motion of the first member in the direction along directions of rotation of the first bevel gear, the second bevel gear, or the third bevel gear,
wherein the first member is movable relatively to the second member in a range allowed by the limiter,
wherein the first bevel gear member, the second bevel gear member, or the third bevel gear member has a plurality of teeth arrayed along a direction of rotation of the first bevel gear, the second bevel gear, or the third bevel gear, and
wherein a range allowed by the limiter for the first member to be movable is set to a value equal to or smaller than ½ of an angle between two adjacent teeth of the plurality of teeth.

2. The joint unit according to claim 1,
wherein the first member, the second member, and the resilient member are included in each of the first bevel gear and the bevel second gear, and
wherein the first members included in the first bevel gear and the second bevel gear are normally urged by respective resilient members to rotate in a same direction.

3. The joint unit according to claim 1,
wherein the first member, the second member, and the resilient member are included in each of the first bevel gear and the second bevel gear, and
wherein the two first members included in the first bevel gear and the second bevel gear are normally urged by respective resilient members to move in opposite directions from each other.

4. The joint unit according to claim 1,
wherein the limiter includes a recessed part defined in one of the first member and the second member and a projected part disposed on the other of the first member and the second member
wherein the limiter limits motion of the first member by having the projected part fitted in the recessed part, the first member being allowed to move in a range of a gap between the recessed part and the projected part.

5. The joint unit according to claim 1,
wherein the second member includes a first tubular portion extending from an outer circumferential portion of the first bevel gear member, the second bevel gear member, or the third bevel gear member along a center line of rotation the first bevel gear, the second bevel gear, or the third bevel gear,
wherein the first member is fitted in the first tubular portion of the second member, and
wherein the resilient member is housed in the first tubular portion of the second member.

6. The joint unit according to claim 5, further comprising:
a shaft member that extends through the first member and the second member; and
a bearing member that is disposed between the second member and the shaft member,
wherein the second member further includes a second tubular portion disposed in the first member and extending along a center line of rotation of the first bevel gear, the second bevel gear, or the third bevel gear,
wherein the resilient member is housed in a space defined between the first tubular portion and the second tubular portion of the second member, and
wherein the bearing member is disposed in the resilient member between the second tubular portion of the second member and the shaft member.

7. The joint unit according to claim 1, further comprising:
a drive gear,
wherein the second member is fixed to the drive gear.

8. The joint unit according to claim 7, further comprising:
an electric motor,
wherein the drive gear is connected to the electric motor.

9. A joint unit comprising:
a first bevel gear having a first bevel gear member;
a second bevel gear having a second bevel gear member,
wherein the first bevel gear member faces the second bevel gear member;
a third bevel gear that has a third bevel gear member meshing with both the first bevel gear member and the second bevel gear member,
wherein one of the first bevel gear, the second bevel gear, and the third bevel gear includes
a first member including an inner circumferential portion of the first bevel gear member, the second bevel gear member, or the third bevel gear member,
a second member including an outer circumferential portion of the first bevel gear member, the second bevel gear member, or the third bevel gear member, and
a resilient member attached to one of the first member and the second member for normally urging the other of the first member and the second member to move in a direction along directions of rotation of the first bevel gear, the second bevel gear, or the third bevel gear,
wherein the second member includes a first tubular portion extending from an outer circumferential portion of the first bevel gear member, the second bevel gear member, or the third bevel gear member along a center line of rotation the first bevel gear, the second bevel gear, or the third bevel gear,
wherein the first member is fitted in the first tubular portion of the second member, and
wherein the resilient member is housed in the first tubular portion of the second member
a shaft member that extends through the first member and the second member; and
a bearing member that is disposed between the second member and the shaft member,
wherein the second member further includes a second tubular portion disposed in the first member and extending along a center line of rotation of the first bevel gear, the second bevel gear, or the third bevel gear,
wherein the resilient member is housed in a space defined between the first tubular portion and the second tubular portion of the second member, and wherein the bearing member is disposed in the resilient member between the second tubular portion of the second member and the shaft member.

\* \* \* \* \*